United States Patent Office 3,798,289
Patented Mar. 19, 1974

3,798,289
VINYL HALIDE POLYMER-OLEFIN COPOLYMER ALLOYS
James Edward McGrath, Somerville, and Markus Matzner, Edison, N.J., assignors to Union Carbide Corporation, New York, N.Y.
No Drawing. Filed Dec. 10, 1971, Ser. No. 206,851
Int. Cl. C08f 33/08, 37/18
U.S. Cl. 260—895                    12 Claims

ABSTRACT OF THE DISCLOSURE

Compatible alloys or blends of at least one vinyl halide polymer and at least one copolymer of an olefin and a nitrogen-containing comonomer having a basic characteristic are produced; e.g. an alloy of poly(vinyl chloride) and a copolymer of ethylene and N-methyl-N-vinylacetamide or N,N-dimethylacrylamide.

BACKGROUND OF THE INVENTION

The preparation of blends of two or more polymers has been practiced for many years. However, in many cases mixtures are produced that have little or no utility in practical application because of their poor physical properties and/or the non-compatibility of the polymers. Industry has expended huge sums to produce compatible blends having improved physical properties or to modify the properties of polymers to permit their use in different applications. Among such systems have been the attempts to produce blends of vinyl halide polymers with olefin copolymers.

SUMMARY OF THE INVENTION

It has now been found that certain vinyl halide polymers can be blended with certain olefin copolymers to produce compatible alloys possessing excellent mechanical and physical properties. At high olefin copolymer contents, above about 40 weight percent, the alloys are low tensile modulus, tough, flexible compositions useful as films or as insulation for appliance and automotive electrical conductors. At high vinyl halide polymer contents, the alloys are rigid and flame resistant; they also show improved impact properties as compared to vinyl halide polymers per se and they can be used in the manufacture of pipe and similar applications. It was found that the olefin copolymer functions as a processing aid to the vinyl halide resin making it easier to process the vinyl halide polymers, and that even small amounts of the vinyl halide polymer added to the olefin copolymer render the olefin copolymer paintable. While the alloys of this invention are compatible mixtures and have good mechanical properties, it is known that mixtures of polyethylene and poly(vinyl chloride) are unattractive, incompatible systems with poor mechanical properties.

Poly(vinyl chloride) and ethylene copolymers have many known uses. The vinyl halide polymers are relatively tough, rigid, halogen-containing materials that possess good flame retardant properties, and the ethylene copolymers are tough, rather flexible, possess outstanding chemical resistance and good electrical properties but their flame resistance is poor. The combination of the two, the vinyl halide polymers and the olefin copolymers, into one tough product having the best of the physical and mechanical properties of each would be of great practical importance. Such a product would have the fire-retardancy and rigidity of the vinyl halide polymer with the toughness, chemical resistance and flexibility of the olefin copolymer; this is what has now been accomplished.

The compositions of this invention are homogeneous, compatible alloys or mixtures of a vinyl halide polymer, e.g. poly(vinyl chloride) and certain copolymer of an olefin with a nitrogen-containing comonomer having a basic characteristic, e.g., ethylene/N-methyl-N-vinylacetamide copolymer. The excellent properties of these alloys are believed to be due to the compatibility of the components thereof with each other, which compatibility was completely unexpected in view of the chemical dissimilarities of the two polymers.

The preferred olefin copolymers are those of ethylene with N-methyl-N-vinylacetamide or with N,N-dimethylacrylamide and the preferred vinyl halide polymer is poly(vinyl chloride) or the copolymer of vinyl chloride with up to 2 weight percent ethylene. The olefin copolymer can have a melt index of from about 0.1 to about 200 dgm./min., preferably from about 1 to about 10 dgm./min.

The alloys can have present therein minor amounts of other polymers. Among the most beneficial one can mention poly-epsilon-caprolactone and the copolymers of epsilon-caprolactone, especially the copolymers thereof with oxiranes or epoxides. These polymers are well known and commercially available.

The compositions of this invention are compatible mixtures of at least one vinyl halide polymer and at least one copolymer of an olefin with a nitrogen-containing comonomer having a basic characteristic as hereinafter defined. The vinyl halide polymer can be modified by the presence therein of up to about 25 weight percent of another polymerizable monomer, including, for example, ethylene, propylene, acrylic acid and methacrylic acid and their esters, acrylonitrile, vinyl esters of aliphatic and aromatic carboxylic acids, vinyl alkyl ethers, hydroxyalkyl acrylates and methacrylates, etc. As used in this specification the term poly(vinyl halide) includes the homopolymers and such copolymers of vinyl chloride and vinylidene chloride.

The compatible alloys can contain from about 1 weight percent to about 99 weight percent of the poly(vinyl halide) and from 99 weight percent to 1 weight percent of the ethylene copolymers in the blend. At high poly(vinyl halide) content the alloys are rigid and possess improved impact properties as compared to the unblended poly(vinyl halide). As the concentration of the poly(vinyl halide) decreases and the concentration of the olefin copolymer increases, the alloys become less rigid and more flexible. The alloys are prepared by conventional blending methods, using such known devices as roll mills, mixing extruders, Banbury and Brabender mills, or by solution mixing. The compositions can have present therein antioxidants, asbestos, glass fibers, fillers, pigments, carbon black, titanium dioxide, slip additives, light stabilizers, and other additives in the usual quantities conventionally added to polymers. The compositions can in some instances, be cured, vulcanized or crosslinked by conventional methods known to those skilled in the art to further enhance or modify the physical properties thereof.

The poly(vinyl halide) polymers are well known and require no further description as to their production. Any vinyl halide polymer wherein the vinyl halide is vinyl chloride or vinylidene chloride having up to 25 weight percent of another polymerizable monomer, as these were hereinbefore described, can be used. Illustrative thereof are poly(vinyl chloride), poly(vinylidene chloride), vinyl chloride (95)/methyl acrylate (5), vinyl chloride (98)/vinyl acetate (2), vinyl chloride (97)/ethylene (3), vinylidene chloride (96.5)/acrylic acid (3.5), vinyl chloride (95)/propylene (5), vinyl chloride (90)/2-hydroxypropyl acrylate (10), vinyl chloride (95)/acrylonitrile (5), and similar copolymers known in the art.

The nitrogen-containing comonomers having a basic characteristic used in the production of the olefin copolymer are those of the formula:

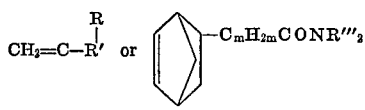

wherein R is hydrogen or alkyl of from 1 to 8 carbon atoms; R' is an

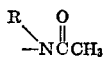

group, an —OCONHR'' group, a —CONR$_2$''' group, a —(CH$_2$)$_m$COOYNR$_2$''' group, a pyridyl group, a —(CH$_2$)$_m$—X-pyridyl group, a quinolyl group, a —(CH$_2$)$_m$—X-quinolyl group or a —CN group; R'' is lower alkyl of from 1 to about 8 carbon atoms or phenyl wherein the phenyl group can be substituted with a lower alkyl group or a halogen atom; R''' taken singly is hydrogen, alkyl of from 1 to about 8 carbon atoms, aryl or substituted aryl of from 6 to 20 carbon atoms (such as phenyl, naphthyl, tolyl, xylyl, benzyl, etc.) or cycloalkyl of from 5 to about 20 carbon atoms (such as cyclopentyl, methylcyclopentyl, dimethylcyclopentyl, cyclohexyl, etc.); both R''' taken together with the N atom to which they are attached can form a heterocyclic ring having from 3 to 12 ring atoms; Y is a divalent alkylene group having from 1 to about 8 carbon atoms; X is nothing or —O— or —S—; and m has a value of 0 to 8. Illustrative of useful polymerizable basic monomers one can mention N-methyl-N-vinylacetamide, vinylacetamide, acrylamide, methacrylamide, N-methylacrylamide, N-isopropylacrylamide, N-t-butylacrylamide, N-hexylacrylamide, N-phenylacrylamide, N - cyclopentylacrylamide, N,N - dimethylacrylamide, N,N-diethylacrylamide, N-methyl-N-phenylacrylamide, N,N-diphenylacrylamide, the 2-, 3- and 4-vinylpyridines, vinyloxypyridine, vinyl pyridyl sulfide, alloxypyridine, allyl pyridyl sulfide, vinylquinoline, vinyl isoquinoline, vinyloxyquinoline, vinyloxy-isoquinoline, vinyl quinolyl sulfide, allyloxyquinoline, allyloxy-isoquinoline, allyl quinolyl sulfide, allyl isoquinolyl sulfide, aminomethyl methacrylate, aminomethyl acrylate, 5-aminopentyl acrylate, 2-aminoisopropyl acrylate, N-methylaminomethyl acrylate, N-butylaminomethyl acrylate, N,N-dimethylaminoethyl acrylate, N-phenylaminoethyl acrylate, N-cyclohexylaminomethyl acrylate, aminophenyl acrylate, N-methylaminophenyl acrylate, aminomethyl butenoate-1, 6-aminohexyl butenoate-1, N-methylaminopropyl butenoate-1, N,N-diethylaminoethyl butenoate-1, N-phenylaminomethyl butenoate-1, N-cyclopentylaminophenyl butenoate-1, 2-carbamylbicyclo[2.2.1]hept-5-ene, 2-(N-methylcarbamyl)bicyclo[2.2.1]hept - 5 - ene, 2-(N-pentylcarbamyl)bicyclo[2.2.1]hept-5-ene, 2-(N,N-dimethylcarbamyl)bicyclo[2.2.1]hept - 5 - ene, 2-(N-phenylcarbamyl)bicyclo[2.2.1]hept - 5 - ene, 2-(N-cyclopentylcarbamyl)bicyclo[2.2.1]hept-5-ene, bicyclo[2.2.1]hept-2-en-5-ylacetamide, 4-(bicyclo[2.2.1]hept - 2 - en-5-yl)butyramide, bicyclo[2.2.1]hept - 2-en-5-yl-N-methylacetamide, bicyclo[2.2.1]hept-2-en-5-yl - N,N - dimethylacetamide. Compounds wherein the two R''' units taken with the N atom form a heterocyclic ring such as 2-(pyridylcarbonyl)bicyclo[2.2.1]hept-5-ene, as well as urethane compounds such as vinyl N-methyl carbamate, vinyl N-ethyl carbamate, vinyl N-phenyl carbamate, are also included.

The olefins used to produce the olefin polymers are those of the formula

CH$_2$=CHR'$^v$ wherein R'$^v$ is hydrogen or alkyl having from 1 to about 8 carbon atoms. Illustrative thereof are ethylene, propylene, butene-1, isobutylene, pentene-1, hexene-1, neopentene-1, octene-1, 3-methylbutene-1, 4-methylpentene-1 and the other known olefins.

The vinyl halides are represented by the formula:

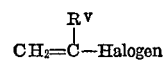

wherein R$^v$ is hydrogen or halogen such as chlorine, fluorine, and bromine.

The poly(vinyl halides) contain the following units in the molecule:

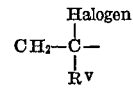

together with the unit of another polymerizable monomer whenever this latter is present.

The copolymer of an olefin and a nitrogen-containing comonomer having a basic characteristic contain the following units in the molecule:

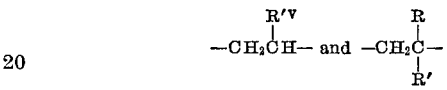

or the units:

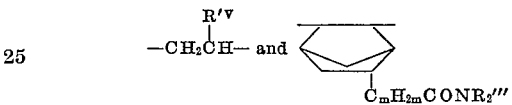

The concentration of the nitrogen-containing monomer in the copolymer thereof with an olefin can vary from about 3 weight percent to about 50 weight percent, and is preferably from about 5 weight percent to about 25 weight percent. These copolymers are well known and they can be produced by the conventional free-radical initiation or emulsion or suspension processes. Illustrative of a few suitable solid copolymers one can mention ethylene/N-methyl-N-vinylacetamide,
ethylene/propylene/N-methyl-N-vinylacetamide,
ethylene/acrylamide,
ethylene/N-methylacrylamide,
ethylene/N,N-dimethylacrylamide,
ethylene/2-vinylpyridine,
ethylene/2-carbamylbicyclo[2.2.1]hept-5-ene,
ethylene/propylene/2-(N,N-dimethylcarbamyl)bicyclo-
  [2.2.1]hept-5-ene and
ethylene/2-aminoethyl acrylate.

The copolymers containing the urethane linkage

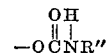

are most readily produced by reacting an ethylene/vinyl alcohol copolymer with a monoisocyanate (methyl isocyanate, butyl isocyanate, cyclohexyl isocyanate, phenyl isocyanate, etc.), under anhydrous conditions with a conventional urethane-forming catalyst, e.g. stannous octoate or dibutyltin dilaurate.

The following examples serve to further describe the invention. In this specification the following test procedures were used:

Melt index, dgm./min. _____ ASTM D 1238–65T
Density, g./cc. _____ ASTM D 1505–63T
Tensile modulus, p.s.i. _____ ASTM D 638–64T
Tensile strength, p.s.i. _____ ASTM D 638–64T
Elongation, percent _____ ASTM D 638–64T
Pendulum impact, ft.-lb./in.$^3$ ____ ASTM D 1822–61T
Izod impact, ft.-lb./in.$^3$ _____ ASTM D 256–56

EXAMPLE 1

Ninety parts of a poly(vinyl chloride) resin having 1.5 weight percent ethylene copolymerized therein was fluxed on a two-roll mill at 175° C. with 2 percent of an alkyl tin mercaptide stabilizer (Advastab TM-180). To the clear melt there was added 10 parts of an ethylene copolymer having a 9.1 weight percent content of N-methyl-N-vinylacetamide and a melt index of 5 dgm./min. The melt remained clear and this was indicative of a high degree of compatibility between the two resins. Compression molded plaques were prepared at a temperature of 175° C. and a pressure of 20,000 p.s.i., these plaques were 20 mils thick. The plaques had a tensile modulus of 240,000 p.s.i., tensile strength of 6,100 p.s.i., elongation at break of 90%, pendulum impact of 60 ft.-lb./in.$^3$ and Izod of 1.4 ft.-lb./in.$^3$ notch. For comparative purposes plaques were compression molded from the same unmodified poly(vinyl chloride) resin; these plaques had an elongation of only 8% and an Izod of only 0.34 ft.-lb./in.3.

EXAMPLE 2

Fifty parts of the same poly(vinyl chloride) resin used in Example 1 and containing the same amount of the tin stabilizer were blended with fifty parts of an ethylene copolymer having 18.4 weight percent N-methyl-N-vinylacetamide and a melt index of 1.5 dgm./min. and then the plaques were compression molded by the same procedure described in Example 1. The molded plaques had a tensile modulus of 21,000 p.s.i., tensile strength of 3,300 p.s.i. and elongation at break at 225% and a pendulum impact of 447 ft.-lb./in.$^3$. These plaques were clear and transparent. The properties of these plaques are to be compared with the properties of the comparative plaques produced in Example 1 using the unmodified poly(vinyl chloride) resin and the improvements in the properties of the novel alloy are readily apparent as compared to the properties of the control.

To the clear blend prepared above, there was added two weight percent dicumyl peroxide and plaques were then compression molded and subsequently crosslinked at 160° C. for 10 minutes. The crosslinked composition had a tensile modulus of 19,000 p.s.i., tensile strength of 3,600 p.s.i., and elongation at break of 255% and a pendulum impact of 468 ft.-lb./in.$^3$.

Attempts to prepare a homogeneous blend of the same poly(vinyl chloride) resin with polyethylene homopolymer produced a cheesy mixture having no practical utility.

When two weight percent of antimony oxide was added to the clear, homogeneous alloy of this example and the mixture then molded into sixty mils thick test plaques it was observed that the plaques self-extinguished in one second after the flame was removed in a simulated vertical fire test.

EXAMPLE 3

Thirty grams of the poly(vinyl chloride) resin of Example 1, containing two weight percent of the same tin stabilizer were fluxed with ten grams of poly(epsilon-caprolactone) having a reduced viscosity of 0.7 (0.2 gram per 100 milliliters of benzene at 30°) at 175° C. Then sixty grams of the same ethylene/N-methyl-N-vinylacetamide copolymer of Example 2 was added to the clear melt and fluxing was continued until homogeneity was achieved. The final melt, which was clear and transparent, was compression molded into plaques 20 mils thick, as described in Example 1. These plaques had a tensile modulus of 12,700 p.s.i., tensile strength of 3,200 p.s.i., elongation at break of 325% and pendulum impact of 500 ft.-lb./in.$^3$.

EXAMPLE 4

In the same manner as described in Example 1 30 parts of the same poly(vinyl chloride) resin were blended with 70 parts of an ethylene copolymer having a 15 weight percent acrylamide content and a melt index of 15 dgm./min. The alloy was compression molded as described in Example 1 to produce plaques 20 mils thick. These plaques had a tensile modulus of 23,000 p.s.i., tensile strength of 1,900 p.s.i., elongation at break of 175% and pendulum impact of 200 ft.-lb./in.$^3$.

EXAMPLE 5

An ethylene copolymer having a 22 weight percent vinyl alcohol content and a melt index of 20 dgm./min. was reacated with n-butyl isocyanate in anhydrous chlorobenzene using 0.1% stannous octoate as the catalyst. This converted all of the hydroxyl groups into urethane groups.

Fifty parts of the ethylene/n-butylurethane copolymer produced above were blended with 50 parts of the same poly(vinyl chloride) used in Example 1 under the same conditions therein set forth. Plaques prepared from this alloy were homogeneous, clear, flexible and transparent. In comparison, when the unmodified ethylene/vinyl alcohol was fluxed with the poly(vinyl chloride) resin, hazy opaque plaques resulted.

Similar results are obtained when methyl isocyanate is substituted for the n-butyl isocyanate.

EXAMPLE 6

Fifty parts of the same stabilized poly(vinyl chloride) used in Example 1 and 50 parts of an ethylene copolymer having an 11 weight percent 4-vinyl pyridine content and a melt index of 10 dgm./min. were dissolved in tetrahydrofuran at 60° C. to give a clear one phase solution. The alloy was precipitated by coagulation with methanol and after separation it was vacuum dried. The dried fluffy alloy was a compatible mixture and plaques were compression molded therefrom.

EXAMPLE 7

In the same manner described in Example 1, fifty parts of the same stabilized poly(vinyl chloride) resin were fluxed with fifty parts of an ethylene copolymer having an 11 weight percent N,N-dimethylaminoethyl methacrylate content and a melt index of 25 dgm./min. The alloy was clear and compatible; tough, flexible films were produced by compression molding at 20,000 p.s.i. at a temperature of 175° C.

EXAMPLE 8

In the same manner described in Example 1, 95 parts of the same stabilized poly(vinyl chloride) was fluxed with 5 parts of an ethylene copolymer having a 13 weight percent acrylonitrile content. The alloy was a tough, rigid, clear and transparent composition having an Izod impact value of 8 ft.-lb./in.$^3$ as compared to a control value of 0.34 ft.-lb./in.$^3$ for the poly (vinyl chloride) per se.

EXAMPLE 9

In the same manner as described in Example 1, twenty parts of the same stabilized poly(vinyl chloride) resin, 100 parts of polyethylene having a melt index of 1 dgm./min. and a density of 0.96 g./cc., 30 parts of ¼ inch long glass fibers and 10 parts of the same ethylene/N-methyl-N-vinyl acetamide copolymer used in Example 2 were fluxed to yield a homogeneous compatible mixture. This mixture was injection molded at 200° C. to produce tough, rigid plaques that were 60 mils thick. These plaques had a very slow burning rate in contrast of the very rapid burning observed with plaques produced from the polyethylene and glass fibers only. The plaques produced from the alloy had a tensile modulus of 370,000 p.s.i., a tensile yield strength of 4,300 p.s.i. and the heat deflection temperature (264 p.s.i.) was 183° F.

EXAMPLE 10

A series of blends was prepared in the manner described in Example 1. The ethylene copolymer had a melt index of 5 dgm./min. and contained 27 weight percent N,N-dimethylacrylamide copolymerized therein. The poly(vinyl chloride) and ethylene copolymer were blended as described in Example 1 and transparent plaques were produced by compression molding. The alloy compositions and the properties thereof are set forth below.

| | | |
|---|---|---|
| Poly(vinyl chloride), parts | 30 | 50 |
| Ethylene copolymer, parts | 70 | 50 |
| Tensile modulus, p.s.i. | 12,600 | 29,000 |
| Tensile strength, p.s.i. | 4,100 | 3,600 |
| Elongation, percent | 350 | 265 |
| Pendulum impact, ft.-lb./in.$^3$ | 630 | 580 |

In comparison, the tensile modulus of the ethylene copolymer itself was only 3,200 p.s.i.

What is claimed is:

1. A polymer alloy comprising at least one vinyl halide polymer selected from the group of homopolymers of said vinyl halide and copolymers of said vinyl halide with up to about 25 weight percent of another polymerizable monomer and at least one olefin copolymer of an olefin of the formula:

$$CH_2=CHR'^v$$

with a nitrogen-containing comonomer having a basic characteristic selected from the group:

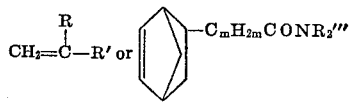

wherein R is hydrogen or alkyl of from 1 to 8 carbon atoms, R' is an

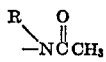

group, an —OCONHR'' group, a —CONR$_2$''' group, a —(CH$_2$)$_m$COOYNR$_2$''' group, a pyridyl group, a —(CH$_2$)$_m$—X—pyridyl group, a quinolyl group, a —(CH$_2$)$_m$—X—quinolyl group, or a —CN group; R'' is lower alkyl of from 1 to 10 carbons, phenyl, lower alkyl substituted phenyl or halogen substituted phenyl; R''' taken singly is hydrogen, alkyl of from 1 to 8 carbons, aryl of from 6 to 20 carbons, or cycloalkyl of from 5 to 20 carbons; and both R''' groups when taken together with the N atom form a heterocyclic ring having from 5 to 12 ring atoms; R'$^v$ is hydrogen, or alkyl of 1 to 8 carbons; Y is divalent alkylene of 1 to 8 carbon atoms; X is noting or —O— or —S—; and $m$ has a value of 0 to 8.

2. A polymer alloy as claimed in claim 1 wherein the vinyl halide polymer is a polymer of a vinyl halide of the formula:

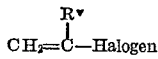

wherein R$^v$ is of the group hydrogen or halogen and wherein said polymer constitutes from about 1 weight percent to about 99 weight percent of the total weight of the vinyl halide polymer plus the olefin copolymer.

3. A polymer alloy as claimed in claim 1 wherein the olefin copolymer is a copolymer of ethylene and N-methyl-N-vinylacetamide.

4. A polymer alloy as claimed in claim 1 wherein the olefin copolymer is a copolymer of ethylene and acrylamide.

5. A polymer alloy as claimed in claim 1 wherein the olefin copolymer is a copolymer of ethylene and n-butylcarbamylethylene.

6. A polymer alloy as caimed in claim 1 wherein the olefin copolymer is a copolymer of ethylene and 4-vinyl pyridine.

7. A polymer alloy as claimed in claim 1 wherein the olefin copolymer is a copolymer of ethylene and N,N-dimethylaminoethyl methacrylate.

8. A polymer alloy as claimed in claim 1 wherein the olefin copolymer is a copolymer of ethylene and acrylonitrile.

9. A polymer alloy as claimed in claim 1 wherein the olefin copolymer is a copolymer of ethylene and N,N-dimethylacrylamide.

10. A polymer alloy as claimed in claim 1 wherein a third polymer is additionally present in said alloy.

11. A polymer alloy as claimed in claim 10 wherein said third polymer is poly-epsilon-caprolactone.

12. A polymer alloy as claimed in claim 10 wherein said third polymer is polyethylene.

References Cited

UNITED STATES PATENTS 3,584,079   6/1971   Trementozzi et al. ____ 260—876

FOREIGN PATENTS 924,457   4/1963   Great Britain _____ 260—897

MURRAY TILLMAN, Primary Examiner

C. SECCURO, Assistant Examiner

U.S. Cl. X.R.

260—896, 897 C